United States Patent
Anderson et al.

(10) Patent No.: US 9,389,779 B2
(45) Date of Patent: Jul. 12, 2016

(54) DEPTH-BASED USER INTERFACE GESTURE CONTROL

(71) Applicant: Intel Corporation, Santa Clara, CA (US)

(72) Inventors: Glen J. Anderson, Beaverton, OR (US); Dror Reif, Be'er-Yacoov (IL); Barak Hurwitz, Kibbutz Alonim (IL); Gila Kamhi, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 13/976,036

(22) PCT Filed: Mar. 14, 2013

(86) PCT No.: PCT/US2013/031367
§ 371 (c)(1),
(2) Date: Jun. 26, 2013

(87) PCT Pub. No.: WO2014/142879
PCT Pub. Date: Sep. 18, 2014

(65) Prior Publication Data
US 2014/0282278 A1  Sep. 18, 2014

(51) Int. Cl.
*G06F 3/033* (2013.01)
*G06F 3/00* (2006.01)
*G06F 3/0488* (2013.01)
(Continued)

(52) U.S. Cl.
CPC ............ *G06F 3/04883* (2013.01); *G06F 3/017* (2013.01)

(58) Field of Classification Search
None
See application file for complete search history.

(56) References Cited

U.S. PATENT DOCUMENTS

| 6,624,833 | B1 * | 9/2003 | Kumar et al. | 715/863 |
| 7,340,077 | B2 * | 3/2008 | Gokturk et al. | 382/103 |
| 8,064,704 | B2 * | 11/2011 | Kim et al. | 382/190 |

(Continued)

FOREIGN PATENT DOCUMENTS

| WO | 2012124837 A1 | 9/2012 |
| WO | 2013077883 A1 | 5/2013 |

(Continued)

OTHER PUBLICATIONS

International Search Report & Written Opinion received for PCT International Patent Application No. PCT/US2013/031367, mailed Dec. 3, 2013, 10 pages.

(Continued)

*Primary Examiner* — Yongjia Pan
(74) *Attorney, Agent, or Firm* — Barnes & Thornburg

(57) ABSTRACT

Technologies for depth-based gesture control include a computing device having a display and a depth sensor. The computing device is configured to recognize an input gesture performed by a user, determine a depth relative to the display of the input gesture based on data from the depth sensor, assign a depth plane to the input gesture as a function of the depth, and execute a user interface command based on the input gesture and the assigned depth plane. The user interface command may control a virtual object selected by depth plane, including a player character in a game. The computing device may recognize primary and secondary virtual touch planes and execute a secondary user interface command for input gestures on the secondary virtual touch plane, such as magnifying or selecting user interface elements or enabling additional functionality based on the input gesture. Other embodiments are described and claimed.

18 Claims, 5 Drawing Sheets

(51) Int. Cl.
*G06F 3/01* (2006.01)
*G06F 3/048* (2013.01)

(56) References Cited

U.S. PATENT DOCUMENTS

| | | | |
|---|---|---|---|
| 8,418,085 B2* | 4/2013 | Snook | G06F 3/017 715/707 |
| 8,462,997 B2* | 6/2013 | Pettit | G06F 17/30029 382/118 |
| 8,625,855 B2* | 1/2014 | El Dokor | 382/106 |
| 8,631,355 B2* | 1/2014 | Murillo | A63F 13/06 715/863 |
| 8,687,044 B2* | 4/2014 | Katz et al. | 348/43 |
| 8,803,888 B2* | 8/2014 | Buban | G06F 3/011 345/473 |
| 2002/0064382 A1* | 5/2002 | Hildreth et al. | 396/100 |
| 2006/0036944 A1* | 2/2006 | Wilson | 715/702 |
| 2010/0235786 A1* | 9/2010 | Maizels | G06F 3/011 715/810 |
| 2010/0302138 A1* | 12/2010 | Poot | G06F 3/017 345/156 |
| 2010/0306716 A1* | 12/2010 | Perez | A63F 13/10 715/863 |
| 2011/0025598 A1* | 2/2011 | Underkoffler et al. | 345/156 |
| 2011/0041100 A1* | 2/2011 | Boillot | G06F 3/011 715/863 |
| 2011/0093820 A1* | 4/2011 | Zhang et al. | 715/863 |
| 2011/0173204 A1* | 7/2011 | Murillo | A63F 13/06 707/741 |
| 2011/0234492 A1* | 9/2011 | Ajmera et al. | 345/158 |
| 2011/0292036 A1 | 12/2011 | Sali et al. | |
| 2012/0242800 A1* | 9/2012 | Ionescu et al. | 348/46 |
| 2012/0249429 A1 | 10/2012 | Anderson et al. | |
| 2012/0249443 A1 | 10/2012 | Anderson et al. | |
| 2012/0268369 A1* | 10/2012 | Kikkeri | 345/157 |
| 2012/0309535 A1* | 12/2012 | Langridge et al. | 463/39 |
| 2012/0327125 A1 | 12/2012 | Kutliroff et al. | |
| 2013/0010071 A1* | 1/2013 | Valik | G06F 3/0304 348/46 |
| 2013/0027296 A1* | 1/2013 | Klein | G06F 3/017 345/156 |
| 2013/0058565 A1 | 3/2013 | Rafii et al. | |
| 2013/0159939 A1* | 6/2013 | Krishnamurthi | 715/863 |
| 2013/0336524 A1* | 12/2013 | Zhang et al. | 382/103 |
| 2014/0009378 A1* | 1/2014 | Chew | 345/156 |
| 2014/0123077 A1* | 5/2014 | Kutliroff | G06F 3/017 715/863 |
| 2014/0201666 A1* | 7/2014 | Bedikian | G06F 3/017 715/771 |
| 2014/0282278 A1* | 9/2014 | Anderson et al. | 715/863 |

FOREIGN PATENT DOCUMENTS

| | | |
|---|---|---|
| WO | 2013085525 A1 | 6/2013 |
| WO | 2013147804 A1 | 10/2013 |

OTHER PUBLICATIONS

Sony Mobile Communications AB, "Xperia™ sola: MT27i," White paper, Apr. 2012, 19 pages.
Yang et al., "TouchCuts and TouchZoom: Enhanced Target Selection for Touch Displays using Finger Proximity Sensing," CHI 2011 ACM Conference on Human Factors in Computing Systems, May 7-11, 2011, pp. 2585-2594.
Liu et al., "Hand Gesture Recognition using Depth Data," Proceedings of the Sixth IEEE International Conference on Automatic Face and Gesture Recognition (FGR'04), May 17-19, 2004, 6 pages.

* cited by examiner

DEPTH-BASED USER INTERFACE GESTURE CONTROL

BACKGROUND

Modern computing devices include ever-increasing processing power combined with improved ability to sense and interact with the surrounding environment. As a consequence of such improved capabilities, many computing devices are adopting new input modalities such as touch computing and gesture-based computing.

User interface gestures may include touch-based input gestures such as tapping, swiping, and otherwise manipulating a touch surface of a computing device. User interface gestures may also include input gestures made without physically touching the computing device, including moving the user's body, limbs, hands, or fingers to command user interface actions. Such movement-based input gestures are sometimes called perceptual or air gestures.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
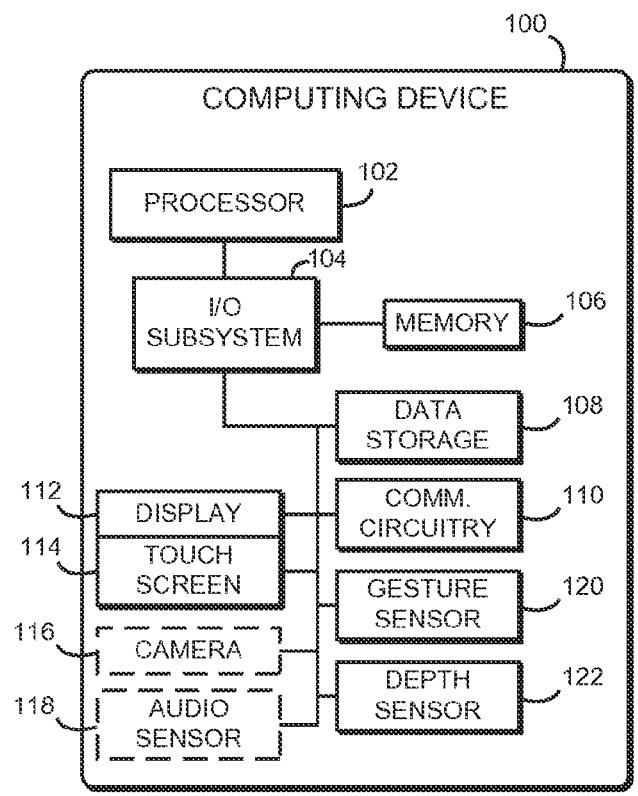
FIG. 1 is a simplified block diagram of at least one embodiment of a computing device for depth-based gesture control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a computing device 100 includes a display 112, a touch screen 114, a gesture sensor 120, and a depth sensor 122. A user of the computing device 100 may interact with the computing device 100 by performing various input gestures, which are detected by the gesture sensor 120. As discussed in more detail below, the input gestures may be performed by the user at some distance in front of the display 112. The computing device 100 is configured to determine the distance to the input gesture—and thereby to the user—using the depth sensor 122 and respond to the input gesture based on the determined depth. Depth-based gesture control allows for natural and fluid gesture control, particularly for user interface metaphors involving depth. Additionally, combining depth-based gesture control with other input modalities such as touch control allows rich interaction with traditional interfaces and may allow users to easily manage complicated user interfaces. Depth-based gesture control also may facilitate interactions with multiple users, particularly when combined with user identification by facial recognition, skeletal tracking, or the like.

The computing device 100 may be embodied as any type of device capable of performing the functions described herein. For example, the computing device 100 may be embodied as, without limitation, a computer, a smart phone, a tablet computer, a laptop computer, a notebook computer, a desktop computer, a workstation, a tabletop computer, a mobile computing device, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to respond to depth-based gesture commands. As shown in FIG. 1, the illustrative computing device 100 includes a processor 102, an input/output subsystem 104, a memory 106, and a data storage device 108. Of course, the computing device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor 102 may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the computing device 100 such as operating systems, applications, programs, libraries, and drivers. The memory 106 is communicatively coupled to the processor 102 via the I/O subsystem 104, which may be embodied as circuitry and/or components to facilitate input/output operations with the processor 102, the memory 106, and other components of the computing device 100. For example, the I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processor 102, the memory 106, and other components of the computing device 100, on a single integrated circuit chip.

The data storage device 108 may be embodied as any type of device or devices configured for short-term or long-term storage of data. For example, the data storage device 108 may be embodied as memory devices and circuits, memory cards, hard disk drives, solid-state drives, or other data storage devices.

The communication circuit 110 of the computing device 100 may be embodied as any communication circuit, device, or collection thereof, capable of enabling communications between the computing device 100 and other remote devices. The communication circuit 110 may be configured to use any one or more communication technologies (e.g., wireless or wired communications) and associated protocols (e.g., Ethernet, Bluetooth®. Wi-Fi®, WiMAX, etc.) to effect such communication. In some embodiments, the communication circuit 110 may be embodied as a network adapter, including a wireless network adapter.

As discussed above, the computing device 100 also includes the display 112. The display 112 may be embodied as any type of display capable of displaying digital information, such as a liquid crystal display (LCD), a light emitting diode (LED) display, a plasma display, a cathode ray tube (CRT), or other type of display device. The display 112 is coupled to a touch screen 114. The touch screen 114 may be embodied as any type of touch screen capable of generating input data in response to being touched by the user of the computing device 100. In some embodiments, the touch screen 114 may be attached to the display 112 or physically incorporated in the display 112. The touch screen 114 may use any suitable touch screen input technology to detect the user's tactile selection of information displayed on the display 112 including, but not limited to, resistive touch screen sensors, capacitive touch screen sensors, camera-based touch screen sensors, surface acoustic wave (SAW) touch screen sensors, infrared touch screen sensors, optical imaging touch screen sensors, acoustic touch screen sensors, and/or other type of touch screen sensors. Additionally, the touch screen 114 may be responsive to multiple simultaneous touch points.

In some embodiments, the computing device 100 may include a camera 116 and/or an audio sensor 118. The camera 116 may be embodied as a digital camera or other digital imaging device integrated with the computing device 100. The camera 116 includes an electronic image sensor, such as an active-pixel sensor (APS), e.g., a complementary metal-oxide-semiconductor (CMOS) sensor, or a charge-coupled device (CCD). The audio sensor 118 may be embodied as any sensor capable of capturing audio signals such as a microphone, a line input jack, an analog-to-digital converter (ADC), or other type of audio sensor.

The computing device 100 further includes the gesture sensor 120, which may be embodied as any type of electronic sensor capable of detecting and recognizing input gestures performed by the user. For example, the gesture sensor 120 may be embodied as a digital video camera capable of capturing moving images of the user. In the illustrative embodiment, no particular resolution is required; in some embodiments the gesture sensor 120 may be capable of resolving only gross motions of the user's body and limbs. In other embodiments, the gesture sensor 120 may be capable of resolving fine detail of the user's face and/or hands. Of course, in other embodiments, other components such as the camera 116 and/or the depth sensor 122 may embody, or otherwise be included in, the gesture sensor 120.

The computing device 100 further includes the depth sensor 122. The depth sensor 122 may be embodied as any type of electronic sensor capable of detecting the distance between the computing device 100 (and/or the display 112) and an input gesture performed by the user. For example, the depth sensor 122 may be embodied as a stereo depth camera, a structured light camera, or a proximity sensor. In some embodiments, the depth sensor 122 may be embodied as, or otherwise include, other components of the computing device 100. For example, the depth sensor 122 may be embodied as, or otherwise include a capacitive or resistive sensor in the touch screen 114 configured to measure distance to the user's fingers. Additionally or alternatively, the depth sensor 122 may be embodied as, or otherwise include, the communication circuit 110. In such embodiments, the communication circuit 110 may be configured to determine the distance to a transmitter manipulated by the user relative to the computing device 100. For example, the computing device 100 may measure signal strength for a short-range communication such as a Bluetooth® or near-field communication, which may be used to determine the distance to the transmitter. A corresponding transmitter may be embedded in a device manipulated by the user, such as a stylus or other pointing device. Additionally or alternatively, the depth sensor 122 may include the camera 116 of the computing device 100, which may be configured to measure the location of a shadow cast by the user—for example from a projector-type display 112—and determine physical distance to the user based on the apparent location of the shadow.

Figure 2:
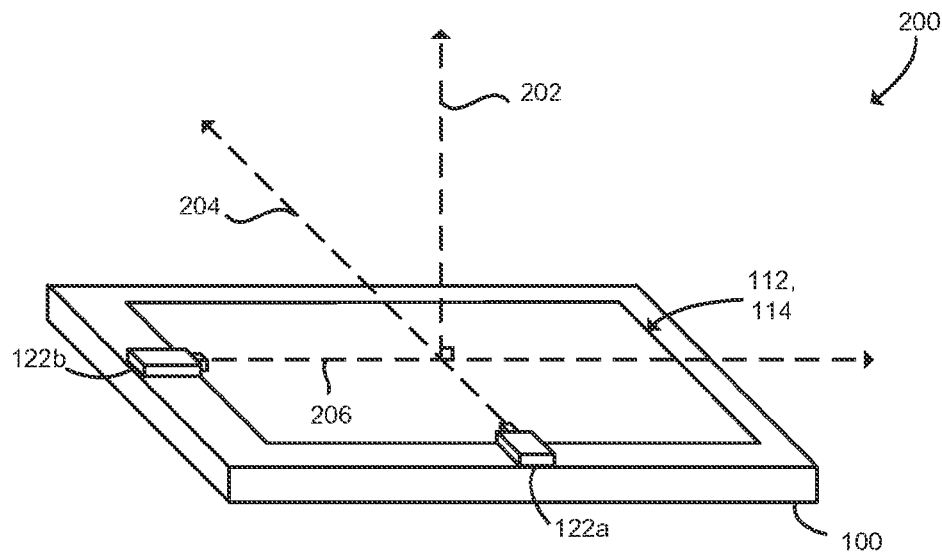
FIG. 2 is a simplified schematic diagram of at least one embodiment of a depth sensor system of the computing device of FIG. 1.

Referring now to FIG. 2, diagram 200 illustrates yet another embodiment of a depth sensor 122. In the illustrative embodiment, the computing device 100 includes the display 112 with an integrated touch screen 114. The display 112 defines a surface normal 202 projecting away from the display 112. The depth sensor 122 includes two visible light cameras 122a, 122b. Each of the cameras 122a, 122b may be aimed independently, as represented by the line-of-sight vectors 204, 206. To perform depth sensing, the cameras 122a, 122b are aimed such that the line-of-sight vectors 204, 206 are parallel to the display 112, perpendicular to each other, and perpendicular to the surface normal 202. In such configuration, the cameras 122a, 122b are capable of determining the location of objects such as the user's fingers near the display 112, including determining the distance from the display 112 to the object.

Figure 3:
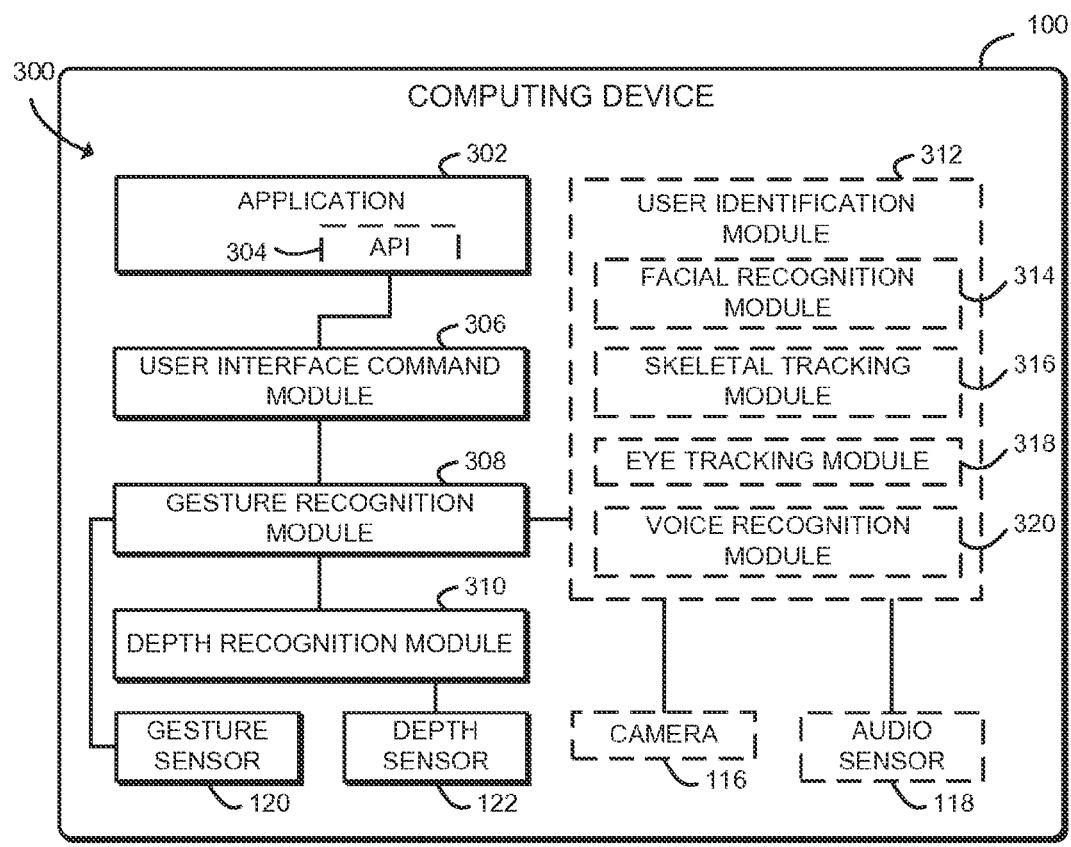
FIG. 3 is a simplified block diagram of at least one embodiment of an environment of the computing device of FIG. 1.

Referring now to FIG. 3, in an illustrative embodiment, the computing device 100 establishes an environment 300 during operation. The illustrative embodiment 300 includes an application 302, a user interface command module 306, a gesture recognition module 308, and a depth recognition module 310. Additionally, in some embodiments, the environment 300 may include a user identification module 312. The various modules of the environment 300 may be embodied as hardware, firmware, software, or a combination thereof.

The application 302 is configured to present a user interface to the user and respond to user interface commands. Such interface may be embodied as a graphical user interface displayed on the display 112 or other user interface. In addition to gesture control, the application 302 may respond to other input modalities such as touch input on the touch screen 114 or input from other peripheral devices (e.g., a keyboard or mouse) attached to the computing device 100. The application 302 may include an application programming interface 304 allowing the application 302 to be controlled by, or otherwise interfaced with, other modules of the computing device 100.

The user interface command module 306 is configured to execute commands at the direction of the user. Such commands may control the operation of the application 302 executing on the computing device 100. In some embodiments, the user interface command module 306 may control the application 302 through the application programming interface 304. Additionally or alternatively, in some embodiments, the user interface command module 306 may also control an operating system of the computing device 100 (not shown).

The gesture recognition module 308 is configured to recognize input gestures performed by the user. Such input gestures may include perceptual or air gestures such as body and limb movement, hand and finger movement, and facial gestures. The input gestures are recognized based on data received from the gesture sensor 120. The recognized input gesture is provided to the user interface command module 306 to control the application 302.

The depth recognition module 310 is configured to receive data from the depth sensor 122 and determine the depth of the input gestures recognized by the gesture recognition module 308. The depth recognition module 310 also assigns the input gesture to a particular depth plane, as described in detail below. As described above, the resulting input gesture and depth information is provided to the user interface command module 306 to control the application 302.

In some embodiments, the environment 300 includes the user identification module 312, which is configured to identify one or more users of the computing device 100 and assign input gestures to the appropriate user. By doing so, the computing device 100 may be used by multiple users simultaneously, or by a single user among other persons not using the computing device 100. The user identification module 312 may identify and distinguish users based on any combination of facial recognition, skeletal tracking, eye tracking, voice recognition, and/or other user identification technology. In some embodiments, those functions may be performed by sub-modules, for example by a facial recognition module 314, a skeletal tracking module 316, an eye tracking module 318, or a voice recognition module 320.

Figure 4:
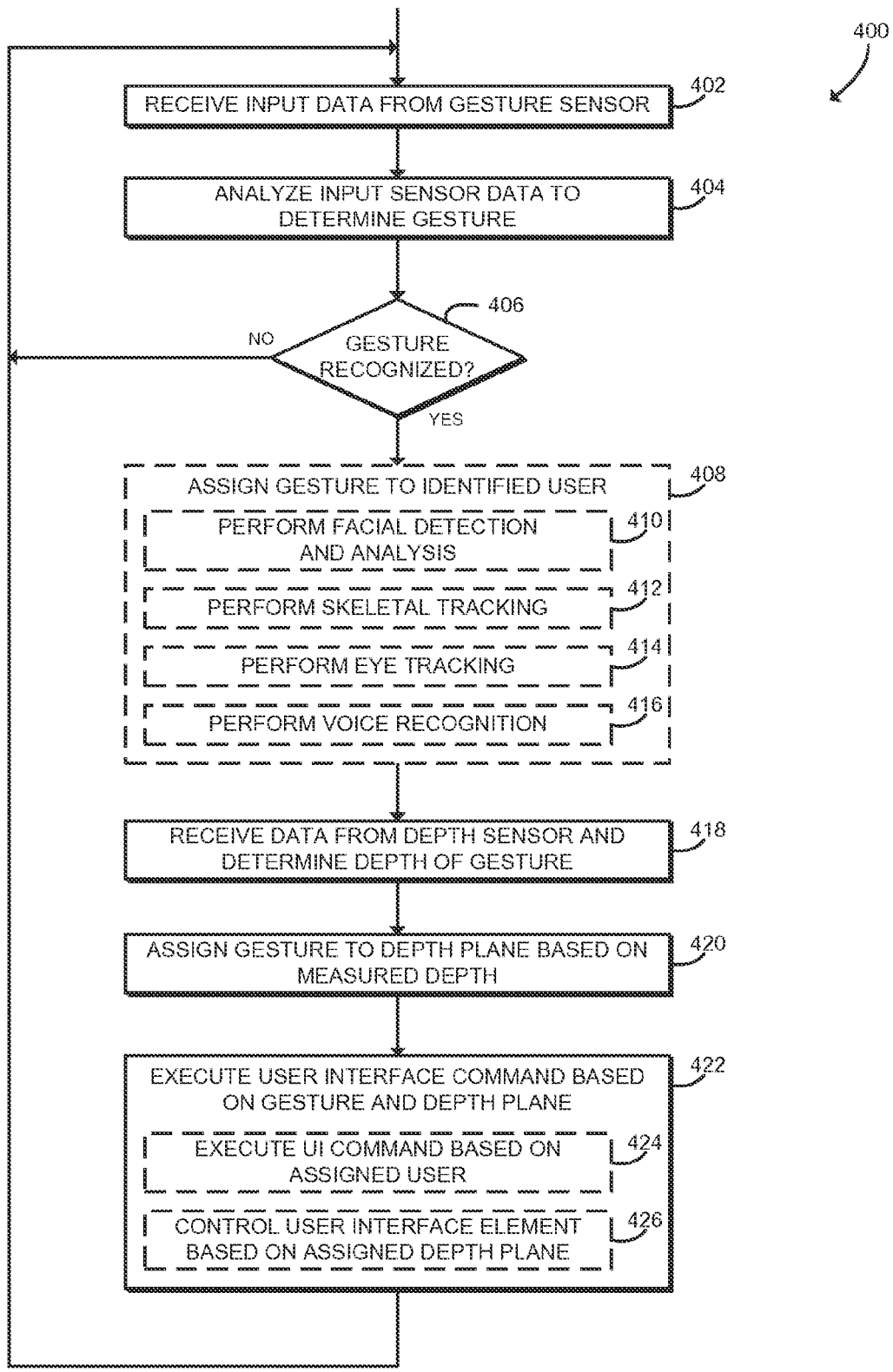
FIG. 4 is a simplified flow diagram of at least one embodiment of a method for depth-based gesture control that may be executed by the computing device of FIGS. 1 and 3.

Referring now to FIG. 4, in use, the computing device 100 may execute a method 400 for depth-based gesture control. The method 400 begins with block 402, in which the computing device 100 receives input sensor data from the gesture sensor 120. As described above, such sensor data may be embodied as a video feed of the user. In other embodiments, such sensor data may be embodied as input data from the touch screen 114 or from other peripheral input devices of the computing device 100.

In block 404, the computing device 100 analyzes the input sensor data to recognize an input gesture made by the user. The types of input gestures recognized may depend on the particular input sensor data being analyzed, a gesture vocabulary of the computing device 100, or on particular input requirements of the application 302. For example, in some embodiments, the recognized input gesture may be an air gesture, for example, the user moving about the room or waving a limb. In some embodiments the input gesture may be a hand movement similar to a touch gesture, such as tapping, swiping, pointing, pinching, spreading, or otherwise manipulating fingers, but performed above the touch screen 114. Body or hand movements not included in the gesture vocabulary may not be recognized as input gestures.

In block 406, the computing device 100 determines whether an input gesture has been recognized. If no input gesture was recognized, the method 400 loops back to block 402 to continue receiving input sensor data. If a gesture was recognized, the method 400 advances to block 408.

In block 408, in some embodiments the computing device 100 may assign the input gesture to an identified user of the computing device 100. For example, in some embodiments, the computing device 100 may be used with multiple users, and each recognized gesture is assigned to a particular identified user. In other embodiments, gestures made by a single user of the computing device 100 may be distinguished from other persons detected by the computing device 100 but not interacting with the computing device 100.

As discussed above, the computing device 100 may use any one or more identification techniques to identify the user and assign the recognized gesture to the identified user. For example, in block 410, the computing device 100 may perform facial detection and analysis to identify the user and assign the input gesture to the identified user. The computing device 100 may perform such facial detection using input data received from the camera 116. Additionally or alternatively, in block 412, the computing device 100 may perform skeletal tracking to identify the user and assign the input gesture to the identified user. For example, the computing device 100 may track all hands, limbs, faces, and other features detectable by the computing device 100, and assign such features to a corresponding skeletal model for a particular user. Constraints on the skeletal model (e.g., typical ranges of angles for joints in the human body, typical lengths and length ratios of bones in the human body, etc.) allow the computing device 100 to distinguish between the features of multiple users. Such skeletal tracking may be performed by the camera 116, the gesture sensor 120, the depth sensor 122, or any combination thereof. Additionally or alternatively, in block 414, the computing device 100 may perform an eye tracking technique to identify the user and assign the gesture to the identified user. For example, the computing device 100 may determine the angle or fixation point of the user's gaze using the camera 116 or using a specialized eye tracking sensor (not shown). Additionally or alternatively, in block 416, the computing device 100 may perform voice recognition to identify the user and assign the gesture to the identified user. Such voice recognition may be performed, for example, using the audio sensor 118.

In some embodiments, the computing device 100 may show a visual representation of the user's limb, fingers, or other body parts on the display 112. Such visual representation provides feedback to the user on how his or her input is being interpreted, what objects on the display 112 may be impacted by the user's input, and depth may be assigned to the gesture. In some embodiments, such visual representation may take the form of an actual image of the user's limb, or may be a cursor or game element that corresponds to the action that the gesture will make.

In block 418, the computing device 100 determines a depth of the input gesture based on data received from the depth sensor 122. As described in detail above, various embodiments of the depth sensor 122 determine the depth of the input gesture in different ways. For example, a stereo camera allows depth to be determined by comparing image data from two camera sensors. A structured light camera allows depth to be determined by analyzing a reflected light pattern. An orthogonal pair of visible light cameras allows depth to be determined by comparing image data from each of the pair of cameras. Such analysis for depth may be performed by the computing device 100 or by hardware, firmware, or software included in the depth sensor 122.

Figure 5:
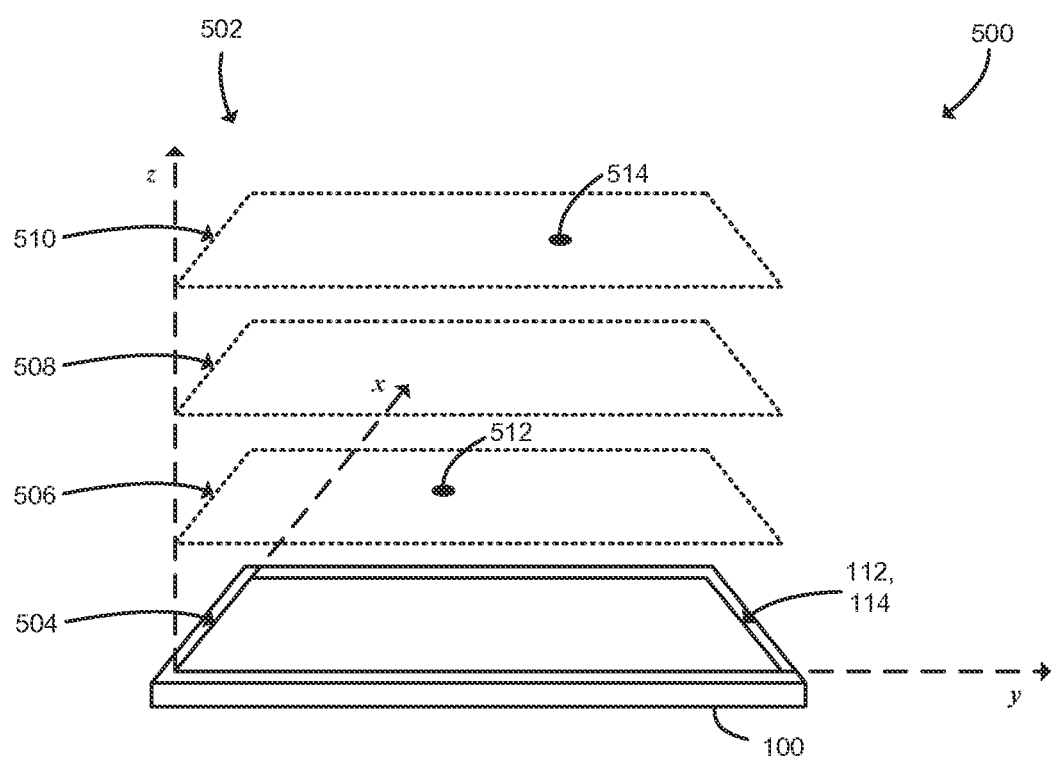
FIG. 5 is a schematic diagram of a plurality of depth planes that may be assigned to input gestures recognized by the computing device of FIGS. 1 and 3.

In block 420, the computing device 100 assigns the input gesture to a depth plane based on the measured depth. For example, as shown in FIG. 5, a diagram 500 illustrates the computing device 100 and a plurality of depth planes 502. The illustrative computing device 100 of FIG. 5 includes a display 112 with an integrated touch screen 114. The display 112 defines a three-dimensional coordinate system, represented by the axes x, y, and z. The z-axis extends perpendicularly away from the display 112 and therefore is referred to as a surface normal of the display 112. Depth planes 504, 506, 508, and 510 are each parallel to the surface of the display 112 and located along the z-axis, thereby representing a series of depth planes 502, each progressively further from the display 112. Because the user generally interacts with the computing device 100 while viewing the display 112 straight-on or nearly straight-on, the depth planes 502 are also progressively closer to the user. The computing device 100 assigns recognized input gestures to a depth plane based on the measured depth of the gesture. For example, input gesture 512 may be assigned to depth plane 506 and input gesture 514 may be assigned to depth plane 510. Input gestures may be assigned to a depth plane by quantizing their measured depth, that is, by rounding their depth to the nearest depth plane. In some embodiments, input gestures that are at a depth greater than a threshold distance from any depth plane may be dropped altogether.

The depth planes 502 are located closely enough together to allow for convenient gesture interaction; in many embodiments, the depth planes 502 may be separated by only a few centimeters. Although the depth planes 502 are illustrated as being equally separated, in some embodiments each of the depth planes 502 may be any distance from neighboring depth planes. Additionally, the location and arrangement of the depth planes 502 may be configurable by the user. Further, although illustrated in FIG. 5 as having four depth planes 502, a fewer or greater number of depth planes 502 may be used in other embodiments. For example, in some embodiments two depth planes 502 may be used. In such embodiments, the depth plane closest to the display 112, for example depth plane 504, may be designated a primary virtual touch plane. In such embodiments, the depth plane furthest from the display 112 and closest to the user, for example depth plane 506, may be designated a secondary virtual touch plane. Further, although depth plane 504 is illustrated as coinciding with the surface of the display 112, in some embodiments the depth plane 504 may be any distance away from the surface of the display 112.

Referring back to FIG. 4, in block 422, the computing device 100 executes a user interface command based on the recognized input gesture and the associated depth plane. For example, in block 424, the computing device 100 may execute a user interface command additionally based on the user assigned to the gesture in block 408. For example, the computing device 100 may allow each user to control a particular application 302 running on the computing device 100, a particular region of the display 112, or particular user interface elements. In some embodiments, each user may be designated a particular depth plane, and input gestures by that user outside of the designated depth plane may be rejected by the computing device 100.

Additionally, in block 426, in some embodiments the computing device 100 may control a particular user interface element based on the assigned depth plane. That is, in some embodiments, each depth plane may control a particular user interface element and/or a particular group or type of user interface elements. For example, referring again to FIG. 5, input gestures on depth plane 504 may control user interface elements of the application 302, while input gestures on depth plane 506 may control "overlay" user interface elements such as transient dialogs, dashboard widgets, operating system controls, and the like. In some embodiments, the application 302 may render user interface elements in a "layered" presentation, such as in drawing applications. Given such an application 302, the user may select a particular layer for manipulation based on the depth plane of the user's input gestures.

In other embodiments, such depth based control of user interface elements may be used with an application 302 that is embodied as a game. For example, in some embodiments the computing device 100 may control a virtual object selected by a depth plane. Such virtual object may be represented with a user interface element on the display 112 and may be modeled with physical characteristics. For example, in such a game application 302, the user may select environmental objects of the game world for control based on the depth plane of the input gesture. In some embodiments, player characters may be controlled through depth-based input gestures. In a specific example, a submarine hunt game may use depth planes 504, 506, and 508. Input gestures in the highest depth plane 508 may control depth charges, input gestures in the middle depth plane 506 may control submarines, and input gestures in the lowest depth plane 504 may control sea-floor vehicles. In another specific example, for a real-time-strategy game, input gestures at the lowest depth plane 504 may control ground units such as marines and medics, input gestures at the middle depth plane 506 may control ranged armor units such as tanks and walkers, and input gestures at the highest depth plane 508 may control air- and space-based units such as space cruisers. Referring back to FIG. 4, following execution of the user interface command, the method 400 loops back to block 402 to continue receiving sensor input data.

Figure 6:
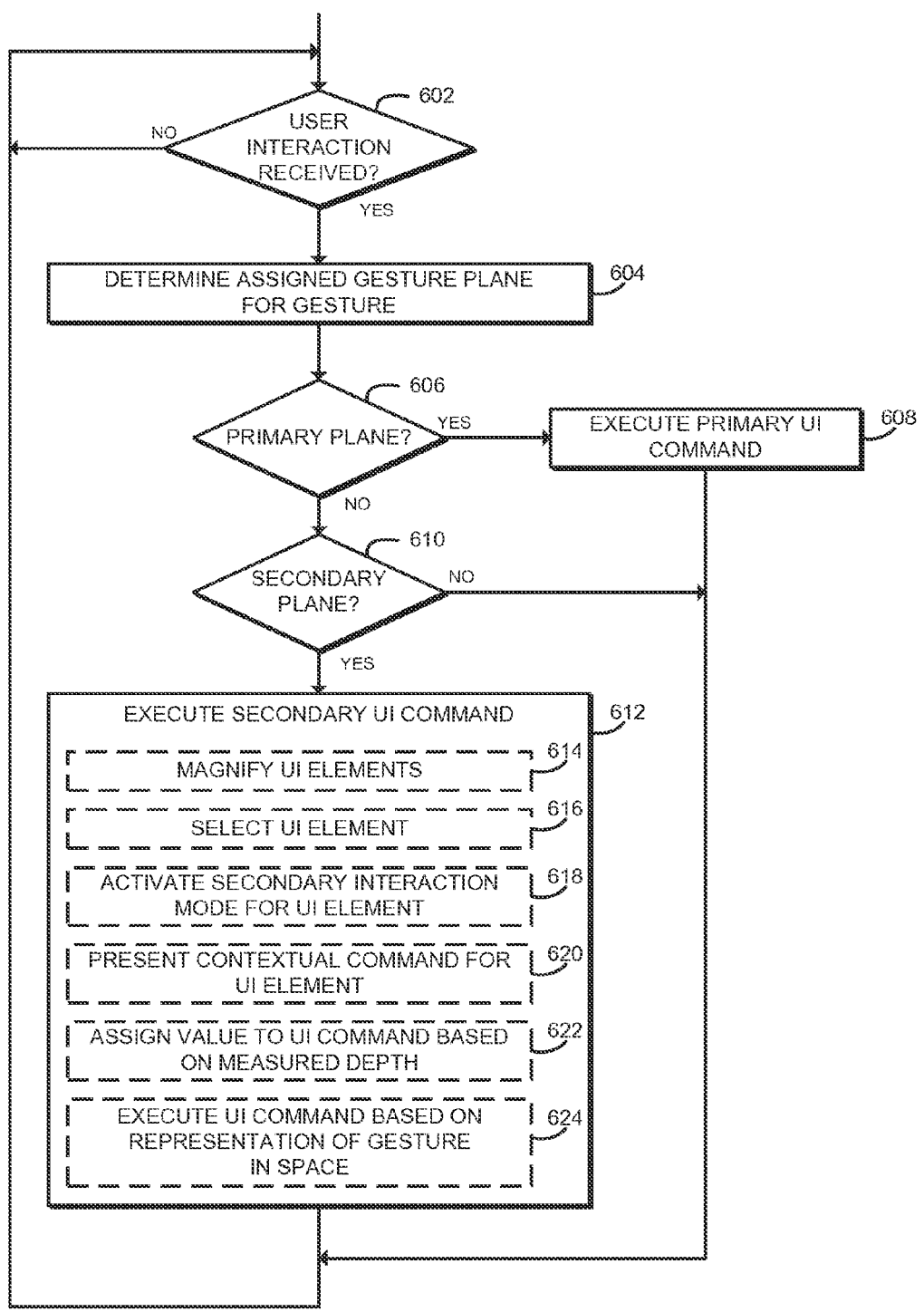
FIG. 6 is a simplified flow diagram of at least one embodiment of a method for primary or secondary user interface command execution that may be executed by the computing device of FIGS. 1 and 3.

In some embodiments, the user interface command executed in response to a particular gesture may depend on the particular depth plane in which the input gesture was performed. That is, the same input gesture (e.g., a swipe or double click gesture) may generate different user interface commands depending on the particular depth plane at which the input gesture was performed. As such, in some embodiments, the computing device 100 may execute a method 600 to execute a primary or secondary user interface command based on the depth plane assigned to an input gesture as shown in FIG. 6. The method 600 begins in block 602, in which the computing device 100 determines whether a user interaction has been received. Such determination involves receiving sensor input from the gesture sensor 120, determining whether an input gesture has been recognized, and in some embodiments assigning an identified user to the recognized input gesture. Such functions are described above with respect to blocks 402, 404, 406, and 408 of FIG. 4. If a user interaction has not been received, the method 600 loops back to continue waiting for user interactions in block 602. If a user interaction has been received, the method 600 advances to block 604.

In block 604, the computing device 100 determines the assigned gesture plane for the recognized input gesture, based on sensor data received from the depth sensor 122. Such assignment is described above with respect to blocks 418 and 420 of FIG. 4. However, in the illustrated method 600, the input gesture may be assigned to one of two depth planes: the primary virtual touch plane or the secondary virtual touch plane. Of course, in other embodiments, additional depth planes may be implemented.

In block 606, the computing device 100 determines whether the input gesture is assigned to the primary virtual touch plane. As described above, the primary virtual touch plane is the depth plane closest to the display 112, for example the depth plane 504 of FIG. 5. Thus, in some embodiments, if assigned to the primary virtual touch plane, the input gesture may have been performed on the touch screen 114 itself (e.g., a tactile selection by the user sensed by the touch screen 114). If the input gesture was assigned to the primary virtual touch plane, the method 600 branches to block 608 in which the computing device 100 executes a primary user interface command. The primary user interface command may correspond to a primary input modality of the computing device 100, for example, tapping the touch screen 114 or clicking a primary button of a pointing device of the computing device 100. Such primary user interface command, when executed, may result in the computing device 100 executing an application 302, opening a file, activating a user interface element, or any other function that may be activated using a typical input modality of a computing device. After executing the primary user interface command in block 608, the method 600 loops back to block 602 to continue waiting for user interactions.

Referring back to block 606, if the input gesture is not assigned to the primary virtual touch plane, the method 600 advances to block 610. In block 610, the computing device 100 determines whether the input gesture is assigned to the secondary virtual touch plane. As described above, the secondary virtual touch plane is a depth plane in front of the display 112 and closer to the user than the primary virtual touch plane, for example the depth plane 506 of FIG. 5. If the input gesture is not assigned to the secondary virtual touch plane, the method 600 loops back to block 602 without executing any user interface command to continue waiting for user interactions. In such embodiments, the input gesture may have been performed too far away from the touch screen 114, for example. If the gesture is assigned to the secondary virtual touch plane, the method 600 advances to block 612.

In block 612, the computing device 100 executes a secondary user interface command. The secondary user interface command may correspond to a secondary input modality of the computing device 100, for example, long-pressing the touch screen 114, pointing a cursor using a pointing device of the computing device 100, or clicking a secondary button of a pointing device of the computing device 100. The secondary user interface command is different from the primary user interface command, and in some embodiments may only be activated through interaction with the secondary virtual touch plane. Numerous such secondary user interface commands are possible. Additionally, in embodiments including additional depth planes, tertiary, quaternary, quinary, etc. interface commands may be assigned to the same input gesture performed on the corresponding depth planes.

The secondary user interface command may be embodied as any type of user interface command different from the primary interface command. For example, in block 614, the computing device 100 may magnify one or more user interface elements on the display 112. Such user interface elements include icons, buttons, images, labels, and similar components typical of a graphical user interface. For example, the computing device 100 may magnify a region of the display 112 underneath the user's hand and display the magnified region on a different part of the display 112, to allow interaction with user interface elements that would otherwise be obscured by the user's hand.

In some embodiments, in block 616, the computing device 100 may select one or more user interface elements. The selected user interface elements may be highlighted or otherwise visually distinguished on the display 112. For example, the user may choose from or "scroll" through a group of menu icons (e.g., for moving, copying, or deleting) by gesturing at the icons on the secondary virtual touch plane and select the desired icon from the menu via an input gesture on the primary plane and/or the touch screen 114. Additionally, in some embodiments, in block 618, the computing device 100 may activate a secondary interaction mode for one or more user interface elements. The secondary interaction mode may provide commands and allow for manipulation different from the ordinary interaction mode of the user interface elements. Such commands may be accessible through further interactions on the secondary virtual touch plane or on the primary virtual touch plane. User interface elements with an activated secondary interaction mode may be visually distinguished on the display 112, for example by rendering the user interface elements as "lifted" or otherwise located in front of other user interface elements. For example, the primary interaction mode, accessible via input gestures performed on the primary plane, may allow icons to be moved, rearranged, or reordered inside a current window on the display 112. In such example, the secondary interaction mode, accessible via input gestures performed on the secondary plane, may allow the icons to be moved to a different window on the display 112 or to another device (not illustrated).

In some embodiments, in block 620, the computing device 100 may present one or more contextual commands to the user based on the input gesture. For example, the computing device 100 may display contextual commands on the display 112 near the location of the input gesture. For example, in a drawing application 302 (see FIG. 3), the computing device 100 may display a tool box near the location of the gesture, allowing the user to change the drawing mode or select options without moving the user's hand long distances. In other embodiments, the computing device 100 may present a group of commands based on a user interface element associated with the input gesture. For example, the computing device 100 may present a contextual menu based on an icon on the display 112 underneath the user's hand, similar to a secondary click operation of a conventional mouse.

In some embodiments, in block 622, the computing device 100 may assign a value to a user interface command based on the measured depth of the input gesture. Such assigned value may alter the operation of the user interface command. Returning to the example of the drawing application 302, the assigned value may correspond to "pressure," allowing the user to control the weight of lines drawn by adjusting the distance between the display 112 and the input gesture.

Additionally, in some embodiments, in block 624, the computing device 100 may execute a user interface command based on a representation of the input gesture in space. Such representation may include the three-dimensional position and velocity vectors of the input gesture. In such embodiments, the gesture is recognized in a touch volume, that is, a three-dimensional region of space that accepts user interactions. The representation of the input gesture in space may correspond to user interface commands to manipulate representations of virtual objects on the display 112. For example, the user interface may model the reactions of physical controls such as levers, sliders, rotating dials, thumbwheels, and the like. The reaction to the user interface command depends on the input gesture and the modeled physical attributes of the user interface elements.

After execution of block 612, the method 600 loops back to block 602 to continue waiting for additional user interactions. In this way, a user of the computing device 100 may interact with the computing device 100 to perform different user interface commands using the same input gesture performed at different depth planes.

EXAMPLES

Example 1 includes a computing device for depth-based gesture control, the computing device comprising a display to define a surface normal; a depth sensor to generate depth sensor data indicative of a depth relative to the display of an input gesture performed by a user of the computing device in front of the display; a gesture recognition module to recognize the input gesture; a depth recognition module to receive the depth sensor data from the depth sensor; determine the depth of the input gesture as a function of the depth sensor data; and assign a depth plane to the input gesture as a function of the depth of the input gesture, wherein each depth plane is positioned parallel to the display and intersects the surface normal; and a user command module to execute a user interface command based on the input gesture and the assigned depth plane.

Example 2 includes the subject matter of Example 1, and wherein to assign the depth plane further comprises to assign a depth plane of a plurality of depth planes as a function of the depth of the input gesture relative to the display.

Example 3 includes the subject matter of any of Examples 1 and 2, and wherein the depth sensor comprises a stereo depth camera.

Example 4 includes the subject matter of any of Examples 1-3, and wherein the depth sensor comprises a structured light camera.

Example 5 includes the subject matter of any of Examples 1-4, and wherein the depth sensor comprises a plurality of cameras, wherein each camera of the plurality of cameras is aimed perpendicular to the surface normal of the display and perpendicular to another camera of the plurality of cameras.

Example 6 includes the subject matter of any of Examples 1-5, and further wherein the depth sensor comprises a camera; to receive the depth sensor data comprises to receive image data from the camera; and to determine the depth of the input gesture comprises to determine the depth of the input gesture as a function of a position of a shadow cast by the user captured in the received image data.

Example 7 includes the subject matter of any of Examples 1-6, and wherein the depth sensor comprises a proximity sensor.

Example 8 includes the subject matter of any of Examples 1-7, and wherein the depth sensor comprises a radio receiver; the depth recognition module is further to receive, using the radio receiver, a signal transmitted by a transmitter manipulated by the user; and to receive the depth sensor data comprises to receive signal strength data associated with the received signal from the radio receiver.

Example 9 includes the subject matter of any of Examples 1-8, and wherein to execute the user interface command based on the assigned depth plane comprises to select a virtual object as a function of the assigned depth plane; and to control the virtual object based on the input gesture.

Example 10 includes the subject matter of any of Examples 1-9, and wherein to select the virtual object comprises to select a player character as a function of the assigned depth plane.

Example 11 includes the subject matter of any of Examples 1-10, and wherein the user command module is further to configure, prior to recognition of the input gesture, the user interface command to be executed based on the input gesture and the assigned depth plan.

Example 12 includes the subject matter of any of Examples 1-11, and wherein to execute the user interface command comprises to determine whether the assigned depth plane comprises a secondary virtual touch plane of the computing device; and execute a secondary user interface command in response to a determination that the assigned depth plane comprises the secondary virtual touch plane.

Example 13 includes the subject matter of any of Examples 1-12, and wherein the secondary user interface command is accessible only through the secondary virtual touch plane.

Example 14 includes the subject matter of any of Examples 1-13, and wherein to execute the secondary user interface command comprises to magnify a user interface element displayed on the display.

Example 15 includes the subject matter of any of Examples 1-14, and wherein to execute the secondary user interface command comprises to select a user interface element displayed on the display.

Example 16 includes the subject matter of any of Examples 1-15, and wherein to execute the secondary user interface command comprises to activate a secondary interaction mode for the user interface element, wherein a primary interaction mode for the user interface element is accessible via a touch screen of the display.

Example 17 includes the subject matter of any of Examples 1-16, and wherein to execute the secondary user interface command comprises to display a contextual command menu on the display.

Example 18 includes the subject matter of any of Examples 1-17, and wherein to execute the secondary user interface command comprises to assign a value to the secondary user interface command as a function of the depth of the input gesture.

Example 19 includes the subject matter of any of Examples 1-18, and wherein to execute the secondary user interface command comprises to assign a three-dimensional position and velocity to the secondary user interface command as a function of the input gesture.

Example 20 includes the subject matter of any of Examples 1-19, and further including a user recognition module to identify the user of the computing device; and assign the input gesture to the identified user; wherein to execute the user interface command further comprises to execute the user interface command as a function of the user assigned to the input gesture.

Example 21 includes the subject matter of any of Examples 1-20, and wherein the user recognition module further comprises a facial recognition module to identify the user by facial recognition.

Example 22 includes the subject matter of any of Examples 1-21, and wherein the user recognition module further comprises a skeletal tracking module to track a skeletal model of the identified user, the skeletal model having a limb; and to assign the input gesture to the identified user comprises to assign the input gesture to the limb of the skeletal model of the identified user.

Example 23 includes the subject matter of any of Examples 1-22, and wherein the user recognition module further comprises an eye tracking module to identify the user by eye tracking.

Example 24 includes the subject matter of any of Examples 1-23, and wherein the user recognition module further comprises a voice recognition module to identify the user by voice recognition.

Example 25 includes the subject matter of any of Examples 1-24, and wherein the user recognition module is further to configure the depth plane to be assigned to the input gesture assigned to the user.

Example 26 includes a method for depth-based gesture control, the method comprising recognizing, on a computing device, an input gesture performed by a user of the computing device in front of a display of the computing device; receiving, on the computing device, depth sensor data indicative of a depth relative to the display of the input gesture from a depth sensor of the computing device; determining, on the computing device, the depth of the input gesture as a function of the depth sensor data; assigning, on the computing device, a depth plane to the input gesture as a function of the depth of the input gesture, wherein each depth plane is parallel to the display and intersects a surface normal of the display; and executing, on the computing device, a user interface command based on the input gesture and the assigned depth plane.

Example 27 includes the subject matter of Example 26, and wherein assigning the depth plane further comprises assigning a depth plane of a plurality of depth planes as a function of the depth of the input gesture relative to the display.

Example 28 includes the subject matter of any of Examples 26 and 27, and wherein receiving the depth sensor data comprises receiving depth sensor data from a stereo depth camera of the computing device.

Example 29 includes the subject matter of any of Examples 26-28, and wherein receiving the depth sensor data comprises receiving depth sensor data from a structured light camera of the computing device.

Example 30 includes the subject matter of any of Examples 26-29, and wherein receiving the depth sensor data comprises receiving depth sensor data from a plurality of cameras of the computing device, wherein each camera of the plurality of cameras is aimed perpendicular to the surface normal of the display and perpendicular to another camera of the plurality of cameras.

Example 31 includes the subject matter of any of Examples 26-30, and wherein receiving the depth sensor data comprises receiving image data from a camera of the computing device; and determining the depth of the input gesture comprises determining the depth of the input gesture as a function of a position of a shadow cast by the user captured in the received image data.

Example 32 includes the subject matter of any of Examples 26-31, and wherein receiving the depth sensor data comprises receiving depth sensor data from a proximity sensor of the computing device.

Example 33 includes the subject matter of any of Examples 26-32, and further including receiving, on the computing device, using a radio receiver of the computing device, a signal transmitted by a transmitter manipulated by the user; wherein receiving the depth sensor data comprises receiving signal strength data associated with the received signal from the radio receiver.

Example 34 includes the subject matter of any of Examples 26-33, and wherein executing the user interface command based on the assigned depth plane comprises selecting a virtual object as a function of the assigned depth plane; and controlling the virtual object based on the input gesture.

Example 35 includes the subject matter of any of Examples 26-34, and wherein selecting the virtual object comprises selecting a player character as a function of the assigned depth plane.

Example 36 includes the subject matter of any of Examples 26-35, and further including configuring, on the computing device, prior to recognizing the input gesture, the user interface command to be executed based on the input gesture and the assigned depth plan.

Example 37 includes the subject matter of any of Examples 26-36, and wherein executing the user interface command comprises determining whether the assigned depth plane comprises a secondary virtual touch plane of the computing device; and executing a secondary user interface command in response to determining the assigned depth plane comprises the secondary virtual touch plane.

Example 38 includes the subject matter of any of Examples 26-37, and further including allowing access to the secondary user interface command only through the secondary virtual touch plane.

Example 39 includes the subject matter of any of Examples 26-38, and wherein executing the secondary user interface command comprises magnifying a user interface element displayed on the display of the computing device.

Example 40 includes the subject matter of any of Examples 26-39, and wherein executing the secondary user interface command comprises selecting a user interface element displayed on the display of the computing device.

Example 41 includes the subject matter of any of Examples 26-40, and wherein executing the secondary user interface command comprises activating a secondary interaction mode for the user interface element, wherein a primary interaction mode for the user interface element is accessible via a touch screen of the display.

Example 42 includes the subject matter of any of Examples 26-41, and wherein executing the secondary user interface command comprises displaying a contextual command menu.

Example 43 includes the subject matter of any of Examples 26-42, and wherein executing the secondary user interface command comprises assigning a value to the secondary user interface command as a function of the depth of the input gesture.

Example 44 includes the subject matter of any of Examples 26-43, and wherein executing the secondary user interface command comprises assigning a three-dimensional position and velocity to the secondary user interface command as a function of the input gesture.

Example 45 includes the subject matter of any of Examples 26-44, and further including identifying, on the computing device, the user of the computing device; and assigning, on the computing device, the input gesture to the identified user; wherein executing the user interface command further comprises executing the user interface command as a function of the user assigned to the input gesture.

Example 46 includes the subject matter of any of Examples 26-45, and wherein identifying the user comprises identifying the user by facial recognition.

Example 47 includes the subject matter of any of Examples 26-46, and wherein assigning the input gesture to the identified user comprises tracking a skeletal model of the identified user, the skeletal model having a limb; and assigning the input gesture to the identified user comprises assigning the gesture to the limb of the skeletal model of the identified user.

Example 48 includes the subject matter of any of Examples 26-47, and wherein identifying the user comprises identifying the user by eye tracking.

Example 49 includes the subject matter of any of Examples 26-48, and wherein identifying the user comprises identifying the user by voice recognition.

Example 50 includes the subject matter of any of Examples 26-49, and further including configuring, on the computing device, the depth plane to be assigned to the input gesture assigned to the user.

Example 51 includes a computing device comprising a processor; and a memory having stored therein a plurality of instructions that when executed by the processor cause the computing device to perform the method of any of Examples 26-50.

Example 52 includes one or more machine-readable storage media comprising a plurality of instructions stored thereon that in response to being executed result in a computing device performing the method of any of Examples 26-50.

Example 53 includes a computing device for depth-based gesture control, the computing device comprising means for recognizing, on a computing device, an input gesture performed by a user of the computing device in front of a display of the computing device; means for receiving, on the computing device, depth sensor data indicative of a depth relative to the display of the input gesture from a depth sensor of the computing device; means for determining, on the computing device, the depth of the input gesture as a function of the depth sensor data; means for assigning, on the computing device, a depth plane to the input gesture as a function of the depth of the input gesture, wherein each depth plane is parallel to the display and intersects a surface normal of the display; and means for executing, on the computing device, a user interface command based on the input gesture and the assigned depth plane.

Example 54 includes the subject matter of Example 53, and wherein the means for assigning the depth plane further comprises means for assigning a depth plane of a plurality of depth planes as a function of the depth of the input gesture relative to the display.

Example 55 includes the subject matter of any of Examples 53 and 54, and wherein the means for receiving the depth sensor data comprises means for receiving depth sensor data from a stereo depth camera of the computing device.

Example 56 includes the subject matter of any of Examples 53-55, and wherein the means for receiving the depth sensor data comprises means for receiving depth sensor data from a structured light camera of the computing device.

Example 57 includes the subject matter of any of Examples 53-56, and wherein the means for receiving the depth sensor data comprises means for receiving depth sensor data from a plurality of cameras of the computing device, wherein each camera of the plurality of cameras is aimed perpendicular to the surface normal of the display and perpendicular to another camera of the plurality of cameras.

Example 58 includes the subject matter of any of Examples 53-57, and wherein the means for receiving the depth sensor data comprises means for receiving image data from a camera of the computing device; and the means for determining the depth of the input gesture comprises means for determining the depth of the input gesture as a function of a position of a shadow cast by the user captured in the received image data.

Example 59 includes the subject matter of any of Examples 53-58, and wherein the means for receiving the depth sensor data comprises means for receiving depth sensor data from a proximity sensor of the computing device.

Example 60 includes the subject matter of any of Examples 53-59, and further including means for receiving, on the computing device, using a radio receiver of the computing device, a signal transmitted by a transmitter manipulated by the user; wherein the means for receiving the depth sensor data comprises means for receiving signal strength data associated with the received signal from the radio receiver.

Example 61 includes the subject matter of any of Examples 53-60, and wherein the means for executing the user interface command based on the assigned depth plane comprises means for selecting a virtual object as a function of the assigned depth plane; and means for controlling the virtual object based on the input gesture.

Example 62 includes the subject matter of any of Examples 53-61, and wherein the means for selecting the virtual object comprises means for selecting a player character as a function of the assigned depth plane.

Example 63 includes the subject matter of any of Examples 53-62, and further including means for configuring, on the computing device, prior to recognizing the input gesture, the user interface command to be executed based on the input gesture and the assigned depth plan.

Example 64 includes the subject matter of any of Examples 53-63, and wherein the means for executing the user interface command comprises means for determining whether the assigned depth plane comprises a secondary virtual touch plane of the computing device; and means for executing a secondary user interface command in response to determining the assigned depth plane comprises the secondary virtual touch plane.

Example 65 includes the subject matter of any of Examples 53-64, and further including means for allowing access to the secondary user interface command only through the secondary virtual touch plane.

Example 66 includes the subject matter of any of Examples 53-65, and wherein the means for executing the secondary user interface command comprises means for magnifying a user interface element displayed on the display of the computing device.

Example 67 includes the subject matter of any of Examples 53-66, and wherein the means for executing the secondary user interface command comprises means for selecting a user interface element displayed on the display of the computing device.

Example 68 includes the subject matter of any of Examples 53-67, and wherein the means for executing the secondary user interface command comprises means for activating a secondary interaction mode for the user interface element, wherein a primary interaction mode for the user interface element is accessible via a touch screen of the display.

Example 69 includes the subject matter of any of Examples 53-68, and wherein the means for executing the secondary user interface command comprises means for displaying a contextual command menu.

Example 70 includes the subject matter of any of Examples 53-69, and wherein the means for executing the secondary user interface command comprises means for assigning a value to the secondary user interface command as a function of the depth of the input gesture.

Example 71 includes the subject matter of any of Examples 53-70, and wherein the means for executing the secondary user interface command comprises means for assigning a three-dimensional position and velocity to the secondary user interface command as a function of the input gesture.

Example 72 includes the subject matter of any of Examples 53-71, and further including means for identifying, on the computing device, the user of the computing device; and means for assigning, on the computing device, the input gesture to the identified user; wherein the means for executing the user interface command further comprises means for executing the user interface command as a function of the user assigned to the input gesture.

Example 73 includes the subject matter of any of Examples 53-72, and wherein the means for identifying the user comprises means for identifying the user by facial recognition.

Example 74 includes the subject matter of any of Examples 53-73, and wherein the means for assigning the input gesture to the identified user comprises means for tracking a skeletal model of the identified user, the skeletal model having a limb; and the means for assigning the input gesture to the identified user comprises means for assigning the gesture to the limb of the skeletal model of the identified user.

Example 75 includes the subject matter of any of Examples 53-74, and wherein the means for identifying the user comprises means for identifying the user by eye tracking.

Example 76 includes the subject matter of any of Examples 53-75, and wherein the means for identifying the user comprises means for identifying the user by voice recognition.

Example 77 includes the subject matter of any of Examples 53-76, and further including means for configuring, on the computing device, the depth plane to be assigned to the input gesture assigned to the user.

The invention claimed is:

1. A computing device for depth-based gesture control, the computing device comprising:
    a display to define a surface normal;
    a depth sensor to:
        generate depth sensor data indicative of a depth relative to the display of an input gesture performed by a user of the computing device in front of the display;
        generate second depth sensor data indicative of a second depth relative to the display of a second input gesture performed by a second user of the computing device in front of the display; and
        generate third depth sensor data indicative of a third depth relative to the display of a third input gesture performed by the second user of the computing device in front of the display;
    a gesture recognition module to recognize the input gesture, the second input gesture, and the third input gesture;
    a depth recognition module to:
        receive the depth sensor data, the second depth sensor data, and the third depth sensor data from the depth sensor;
        determine the depth of the input gesture as a function of the depth sensor data;
        determine the second depth of the second input gesture as a function of the second depth sensor data;
        determine the third depth of the third input gesture as a function of the third depth sensor data;
        assign a depth plane to the input gesture as a function of the depth of the input gesture;
        assign a second depth plane different from the depth plane to the second input gesture as a function of the second depth of the second input gesture; and
        assign a third depth plane different from the second depth plane to the third input gesture as a function of the third depth of the third input gesture;
        wherein each depth plane is positioned parallel to the display and intersects the surface normal; and
    a user command module to:
        designate the second depth plane as an accessible depth plane for the second user;
        execute a user interface command based on the input gesture and the assigned depth plane;
        execute a second user interface command based on the second input gesture and the assigned second depth plane;
        determine whether the third depth is associated with the accessible depth plane for the second user; and
        reject the third input gesture in response to a determination that the third depth is not associated with the accessible depth plane for the second user,
        wherein to execute the second user interface command comprises to:
            determine whether the second assigned depth plane comprises a secondary virtual touch plane of the computing device; and
            execute a secondary user interface command in response to a determination that the assigned second depth plane comprises the secondary virtual touch plane, wherein to execute the secondary user interface command comprises to display a contextual command menu on the display.

2. The computing device of claim 1, wherein the depth sensor comprises one of:
    a stereo depth camera;
    a structured light camera;
    a plurality of cameras, wherein each camera of the plurality of cameras is aimed perpendicular to the surface normal of the display and perpendicular to another camera of the plurality of cameras; or
    a proximity sensor.

3. The computing device of claim 1, wherein:
    the depth sensor comprises a camera;
    to receive the depth sensor data comprises to receive image data from the camera; and
    to determine the depth of the input gesture comprises to determine the depth of the input gesture as a function of a position of a shadow cast by the user captured in the received image data.

4. The computing device of claim 1, wherein:
    the depth sensor comprises a radio receiver;
    the depth recognition module is further to receive, using the radio receiver, a signal transmitted by a transmitter manipulated by the user; and
    to receive the depth sensor data comprises to receive signal strength data associated with the received signal from the radio receiver.

5. The computing device of claim 1, wherein to execute the user interface command based on the assigned depth plane comprises:
    to select a virtual object as a function of the assigned depth plane; and
    to control the virtual object based on the input gesture.

6. The computing device of claim 1, wherein to execute the user interface command comprises one of:
    to magnify a user interface element displayed on the display;

to activate a secondary interaction mode for the user interface element, wherein a primary interaction mode for the user interface element is accessible via a touch screen of the display; or to assign a three-dimensional position and velocity to the secondary user interface command as a function of the input gesture.

7. The computing device of claim 1, further comprising a user recognition module to:
identify the user of the computing device; and
assign the input gesture to the user;
wherein to execute the user interface command further comprises to execute the user interface command as a function of the user assigned to the input gesture.

8. The computing device of claim 7, wherein the user recognition module further comprises a skeletal tracking module to:
track a skeletal feature of the user;
track a skeletal feature of the second user;
wherein to identify the user of the computing device comprises to distinguish between the skeletal feature of the user and the skeletal feature of the second user.

9. The computing device of claim 1, wherein to execute the secondary user interface command comprises to magnify a user interface element displayed on the display.

10. The computing device of claim 1, wherein to execute the secondary user interface command comprises to activate a secondary interaction mode for the user interface element, wherein a primary interaction mode for the user interface element is accessible via a touch screen of the display.

11. The computing device of claim 1, wherein to execute the secondary user interface command comprises to assign a three-dimensional position and velocity to the secondary user interface command as a function of the input gesture.

12. A method for depth-based gesture control, the method comprising:
recognizing, on a computing device, an input gesture performed by a user of the computing device in front of a display of the computing device;
recognizing, on a computing device, a second input gesture performed by a second user of the computing device in front of the display of the computing device;
recognizing, on a computing device, a third input gesture performed by the second user of the computing device in front of the display of the computing device;
receiving, on the computing device, depth sensor data indicative of a depth relative to the display of the input gesture from a depth sensor of the computing device;
receiving, on the computing device, second depth sensor data indicative of a second depth relative to the display of the second input gesture from the depth sensor;
receiving, on the computing device, third depth sensor data indicative of a third depth relative to the display of the third input gesture from the depth sensor;
determining, on the computing device, the depth of the input gesture as a function of the depth sensor data;
determining, on the computing device, the second depth of the second input gesture as a function of the second depth sensor data;
determining, on the computing device, the third depth of the third input gesture as a function of the third depth sensor data;
assigning, on the computing device, a depth plane to the input gesture as a function of the depth of the input gesture;
assigning, on the computing device, a second depth plane different from the depth plane to the second input gesture as a function of the second depth of the second input gesture;
assigning, on the computing device, a third depth plane different from the second depth plane to the third input gesture as a function of the third depth of the third input gesture;
wherein each depth plane is parallel to the display and intersects a surface normal of the display;
designating, on the computing device, the second depth plane as an accessible depth plane for the second user;
executing, on the computing device, a user interface command based on the input gesture and the assigned depth plane;
executing, on the computing device, a second user interface command based on the input gesture and the assigned second depth plane;
determining, on the computing device, whether the third depth is associated with the accessible depth plane for the second user; and
rejecting, on the computing device, the third input gesture in response to a determination that the third depth is not associated with the accessible depth plane for the second user,
wherein executing the second user interface command comprises:
determining whether the assigned second depth plane comprises a secondary virtual touch plane of the computing device; and
executing a secondary user interface command in response to determining the assigned second depth plane comprises the secondary virtual touch plane, wherein executing the secondary user interface command comprises displaying a contextual command menu.

13. The method of claim 12, wherein executing the user interface command comprises one of:
magnifying a user interface element displayed on the display of the computing device;
activating a secondary interaction mode for the user interface element, wherein a primary interaction mode for the user interface element is accessible via a touch screen of the display; or
assigning a three-dimensional position and velocity to the secondary user interface command as a function of the input gesture.

14. The method of claim 12, further comprising:
identifying, on the computing device, the user of the computing device; and
assigning, on the computing device, the input gesture to the identified user; wherein
executing the user interface command further comprises executing the user interface command as a function of the user assigned to the input gesture.

15. One or more non-transitory, machine readable storage media comprising a plurality of instructions that in response to being executed cause a computing device to:
recognize an input gesture performed by a user of the computing device in front of a display of the computing device;
recognize a second input gesture performed by a second user of the computing device in front of a display of the computing device;
recognize a third input gesture performed by the second user of the computing device in front of the display of the computing device;

receive depth sensor data indicative of a depth relative to the display of the input gesture from a depth sensor of the computing device;

receive second depth sensor data indicative of a second depth relative to the display of the second input gesture from the depth sensor;

receive third depth sensor data indicative of a third depth relative to the display of the third input gesture from the depth sensor;

determine the depth of the input gesture as a function of the depth sensor data;

determine the second depth of the second input gesture as a function of the second depth sensor data;

determine the third depth of the third input gesture as a function of the third depth sensor data;

assign a depth plane to the input gesture as a function of the depth of the input gesture, assign a second depth plane different from the depth plane to the second input gesture as a function of the second depth of the second input gesture;

assign a third depth plane different from the second depth plane to the third input gesture as a function of the third depth of the third input gesture;

wherein each depth plane is parallel to the display and intersects a surface normal of the display;

designate the second depth plane as an accessible depth plane for the second user;

execute a user interface command based on the input gesture and the assigned depth plane;

execute, on the computing device, a second user interface command based on the input gesture and the assigned second depth plane;

determine whether the third depth is associated with the accessible depth plane for the second user; and reject the third input gesture in response to a determination that the third depth is not associated with the accessible depth plane for the second user, wherein to execute the second user interface command comprises to:
  determine whether the assigned second depth plane comprises a secondary virtual touch plane of the computing device; and
  execute a secondary user interface command in response to a determination that the assigned depth plane comprises the secondary virtual touch plane, wherein to execute the secondary user interface command comprises to display a contextual command menu on the display.

16. The non-transitory, machine readable media of claim 15, further comprising a plurality of instructions that in response to being executed cause the computing device to allow access to the secondary user interface command only through the secondary virtual touch plane.

17. The non-transitory, machine readable media of claim 15, wherein to execute the secondary user interface command comprises one of to:
  magnify a user interface element displayed on the display of the computing device;
  activate a secondary interaction mode for the user interface element, wherein a primary interaction mode for the user interface element is accessible via a touch screen of the display; or
  assign a three-dimensional position and velocity to the secondary user interface command as a function of the input gesture.

18. The non-transitory, machine readable media of claim 15, further comprising a plurality of instructions that in response to being executed cause the computing device to:
  identify the user of the computing device; and
  assign the input gesture to the identified user; wherein
  to execute the user interface command further comprises to execute the user interface command as a function of the user assigned to the input gesture.

\* \* \* \* \*